US 7,406,698 B2

(12) United States Patent
Richardson

(10) Patent No.: US 7,406,698 B2
(45) Date of Patent: Jul. 29, 2008

(54) DRIVER FRAMEWORK COMPONENT FOR SYNCHRONIZING INTERACTIONS BETWEEN A MULTI-THREADED ENVIRONMENT AND A DRIVER OPERATING IN A LESS-THREADED SOFTWARE ENVIRONMENT

(75) Inventor: John J. Richardson, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 805 days.

(21) Appl. No.: 10/749,787

(22) Filed: Dec. 30, 2003

(65) Prior Publication Data

US 2005/0144330 A1 Jun. 30, 2005

(51) Int. Cl.
*G06F 3/00* (2006.01)
*G06F 9/44* (2006.01)
*G06F 9/46* (2006.01)
*G06F 13/00* (2006.01)
*G06F 12/00* (2006.01)
*G06F 12/14* (2006.01)
*G06F 7/00* (2006.01)

(52) U.S. Cl. .................. 719/321; 719/315; 719/318; 719/328; 710/200; 707/8

(58) Field of Classification Search ................ 719/315, 719/318, 321, 328; 710/200; 707/8
See application file for complete search history.

(56) References Cited

U.S. PATENT DOCUMENTS

| | | | |
|---|---|---|---|
| 3,759,456 A | 9/1973 | Moneagle et al. | |
| 4,519,553 A | 5/1985 | Jesse et al. | |
| 4,531,689 A | 7/1985 | Beach et al. | |
| 4,965,719 A * | 10/1990 | Shoens et al. | 711/100 |
| 5,434,504 A | 7/1995 | Hollis et al. | |
| 5,440,740 A | 8/1995 | Chen et al. | |
| 5,442,789 A | 8/1995 | Baker et al. | |
| 5,625,845 A | 4/1997 | Allran et al. | |
| 5,630,132 A | 5/1997 | Allran et al. | |
| 5,687,376 A | 11/1997 | Celi et al. | |
| 5,715,459 A | 2/1998 | Celi et al. | |
| 5,734,909 A * | 3/1998 | Bennett | 710/200 |
| 5,745,761 A | 4/1998 | Celi et al. | |
| 5,745,762 A | 4/1998 | Celi et al. | |

(Continued)

OTHER PUBLICATIONS

Lee et al., "A Multi-Granularity Locking Model for Concurrency Control in Object-Oriented Database Systems", Feb. 1996, IEEE, vol. 8, No. 1, pp. 144-156.*

*Primary Examiner*—Meng-Ai An
*Assistant Examiner*—Qing-Yuan Wu
(74) *Attorney, Agent, or Firm*—Amin, Turocy & Calvin, LLP

(57) ABSTRACT

The present invention relates to a system and methodology to facilitate automatic interactions between a highly threaded software environment such as an operating system kernel and a module operating in a less threaded environment. This is achieved by supplying adapter objects that employ various automated locking components to synchronize interactions between the environments such as processing of events or interrupts that may be generated in the system. In one aspect, a driver management system is provided that includes a driver framework component (DFC) that is separate from a driver or other type module, wherein the DFC generates objects that facilitate seamless interactions between the driver and a highly threaded system. A presentation component associated with the DFC selectively exposes objects to the driver in a multi-threaded environment.

22 Claims, 10 Drawing Sheets

U.S. PATENT DOCUMENTS

| | | |
|---|---|---|
| 5,835,705 A | 11/1998 | Larsen et al. |
| 5,933,825 A * | 8/1999 | McClaughry et al. .......... 707/8 |
| 5,999,986 A * | 12/1999 | McCauley, III et al. ..... 719/310 |
| 6,092,220 A | 7/2000 | Palmer et al. |
| 6,101,524 A | 8/2000 | Choi et al. |
| 6,108,654 A * | 8/2000 | Chan et al. ..................... 707/8 |
| 6,256,775 B1 | 7/2001 | Flynn |
| 6,421,738 B1 | 7/2002 | Ratan et al. |
| 6,493,745 B1 | 12/2002 | Cherian |
| 6,546,443 B1 * | 4/2003 | Kakivaya et al. ............ 710/200 |
| 6,557,046 B1 * | 4/2003 | McCauley et al. .......... 719/318 |
| 6,772,154 B1 * | 8/2004 | Daynes et al. ................. 707/8 |
| 6,965,893 B1 * | 11/2005 | Chan et al. .................... 707/8 |
| 2002/0032805 A1 * | 3/2002 | Parry ......................... 709/321 |

* cited by examiner

DRIVER FRAMEWORK COMPONENT FOR SYNCHRONIZING INTERACTIONS BETWEEN A MULTI-THREADED ENVIRONMENT AND A DRIVER OPERATING IN A LESS-THREADED SOFTWARE ENVIRONMENT

TECHNICAL FIELD

The present invention relates generally to computer systems, and more particularly to a system and method that employs an adapter object that enables a less threaded software module to interact with a multi-threaded software environment while promoting scalability of the overall system.

BACKGROUND OF THE INVENTION

Modern operating systems drive many of today's technology-based innovations by offering a platform for both hardware and software development while serving many diverse needs. These systems have evolved from more simplistic file management systems to more complex workstations that provide high-end performance at reasonable cost. Such systems often include multi-processing architectures, high-speed memory, advanced peripheral devices, a variety of system libraries and components to aid software development, and intricate/interleaved bus architectures, for example. At the heart of these systems include sophisticated operating systems that manage not only computer-related hardware but, a vast array of software components having various relationships. These components are often described in terms of objects or classes having multi-tiered relationships such as in a hierarchical arrangement for files and directories that are found in many data management systems.

Event driven programs that operate in a multi-threaded environment are generally concerned with synchronization between various components associated with the event. Such programs execute code in response to events (callbacks from a system to program supplied functions), and typically implement a state machine that responds to the event and returns. In an object structured, multi-threaded system, events may occur concurrently from the same or different objects. Due to this concurrency, the data in the program can become corrupt due to concurrent modification by two or more concurrent events.

This concurrency in the program is usually mitigated by a series of locks (code that temporally prevents other code from completion) associated with the data which serialize the sections of code that accesses that data. Manually managing this serialization by separate and unrelated entities (e.g., a device driver having separate discreet code and management from an operating system kernel) can lead to errors in which locks are not utilized when they should be, or not released when the code returns. Also errors occur by separate, unrelated modules in which locks should be acquired and released in a consistent order, and if not—the program causes a deadlock.

The level of effort, and complexity of such program code increases with each event and data instance that is to be synchronized, thus causing writing a reliable version of the code a time consuming and difficult task. The chance of shipping a latent synchronization bug with the program increases along with this complexity since not all synchronization cases may be exercised by testing. One example environment where these type problems may exist is associated with device drivers. Device drivers are considered important components of software that allow a computer to take advantage of new hardware devices. In order to expand operating system capabilities, these systems should also provide support for new hardware devices, and provide associated device drivers.

Due to the nature of the operating system industry, a large number of device drivers are not written by the operating system manufacturer, but by outside third parties, who are typically hardware owners. Outside third parties typically do not have access to base team development resources available within the manufacturer, and are usually more concerned with quickly getting their device driver to market, otherwise they can not sell their device, and thus receive revenue. This problem is exacerbated by the fact that many of these drivers run in an unprotected kernel mode of the operating system (e.g., ring 0), which often implies that the slightest coding error may cause a system crash, or worse, a corruption to files and/or data.

In another related aspect to the problems described above, many large software systems operate in a highly threaded model, and support "plug in" software models to extend the function of the system. Due to the highly threaded nature of the operating system, plug in device drivers generally must also be highly threaded and programming highly threaded software modules is often complex and time consuming. In the case of device drivers, they generally execute in unprotected kernel mode and any errors can cause a system crash, or corruption.

In many cases, simpler modules that control lower throughput devices may be better served by a less threaded model. The insertion of a less threaded module inside of the highly threaded operating system should not compromise overall system parallelism, but only the throughput of the target device. Due to the current close coupling of the operating systems threading model with the device driver, drivers are generally written in a highly threaded manner, even for lower end hardware devices in order that they do not compromise overall system scale-ability. This can occur when threads "back up" in trying to submit parallel commands to the driver that may employ a single synchronization lock, wherein the concurrency of the I/O model can allow multiple commands to be issued to the driver regardless of how highly threaded it actually is.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that adapt or interface a less threaded software module to a highly multi-threaded environment while facilitating overall scalability of a system. This is achieved via an object-based adapter that responds to a system such as an operating system kernel in a highly threaded manner while managing a less threaded series of events in accordance with a programming module such as a device driver, for example. Thus, the present invention provides one or more adapter objects that automatically manage and interface interactions between a highly threaded environment such as an operating system and less threaded modules such as device drivers or other lower threaded modules. Such interactions can include automatically managing and controlling how one or more events are processed between the operating system and drivers even though the operating system performs in a multi-threaded environment as opposed to the less threaded environment of lower level modules.

In one aspect of the present invention, an object is constructed to act as an adapter between the highly threaded environment of the software system, and the potentially less threaded model of a software plug in. The adapter object generally includes internal state data, and one or more sets of locks for managing interactions between system and modules. For example, these locks can include an internal object state lock that provides synchronization for modifications to internal object state data. It is acquired and released for short time intervals in response to an event from the system that modifies the object, or an API call from the software module. This type lock is held as long as is required to perform a state update in a consistent manner wherein respective routines exposed to the highly threaded internal software environment follow applicable operating rules.

Another type lock includes a presentation lock that is acquired when events are presented through callbacks into a less threaded software module. When an event handler callback (or other routine) returns, this lock is automatically released. In general, the Internal object state lock is not held during these event callbacks. The length of time that the presentation lock is held depends on the threading of the software module being called, and can differ markedly from the amount of time that the Internal object state lock is held.

The object adapter in one example code implementation employs a series of reference counts, request deferrals, and other programming practices to facilitate object lifetime and event exposure to the less threaded software module that generally does not rely on holding the internal state lock. An object's internal state may transition while the presentation lock is held, and the notification of these transitions can be queued until the presentation lock is released. Since the Internal state lock is not held on event callbacks into the software module, the software module is free to call API's exposed by the object from within the event handler that is holding the presentation lock. Changes to object state that occur as a result of these API's that would raise a new event are deferred until the presentation lock is released, similar to the arrival of system events to the object. This allows a software layer to act as a boundary layer between the highly threaded software system and less threaded plug in modules in a manner that does not compromise the scale-ability of the overall system.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology to facilitate automatic interactions between a highly threaded software environment such as an operating system kernel and a module operating in a less threaded environment. This is achieved by supplying adapter objects that employ various automated locking components to synchronize interactions between the environments such as processing of events or interrupts that may be generated in the system. In one aspect, a driver management system is provided that includes a driver framework component (DFC) that is separate from a driver or other type module, wherein the DFC generates objects that facilitate seamless interactions between the driver and a highly threaded system. A presentation component associated with the DFC selectively exposes objects to the driver in a multi-threaded environment. The framework component also serializes event processing to automatically mitigate race conditions associated with the event and to simplify driver code generation and management for processing the event.

As used in this application, the terms "component," "object," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
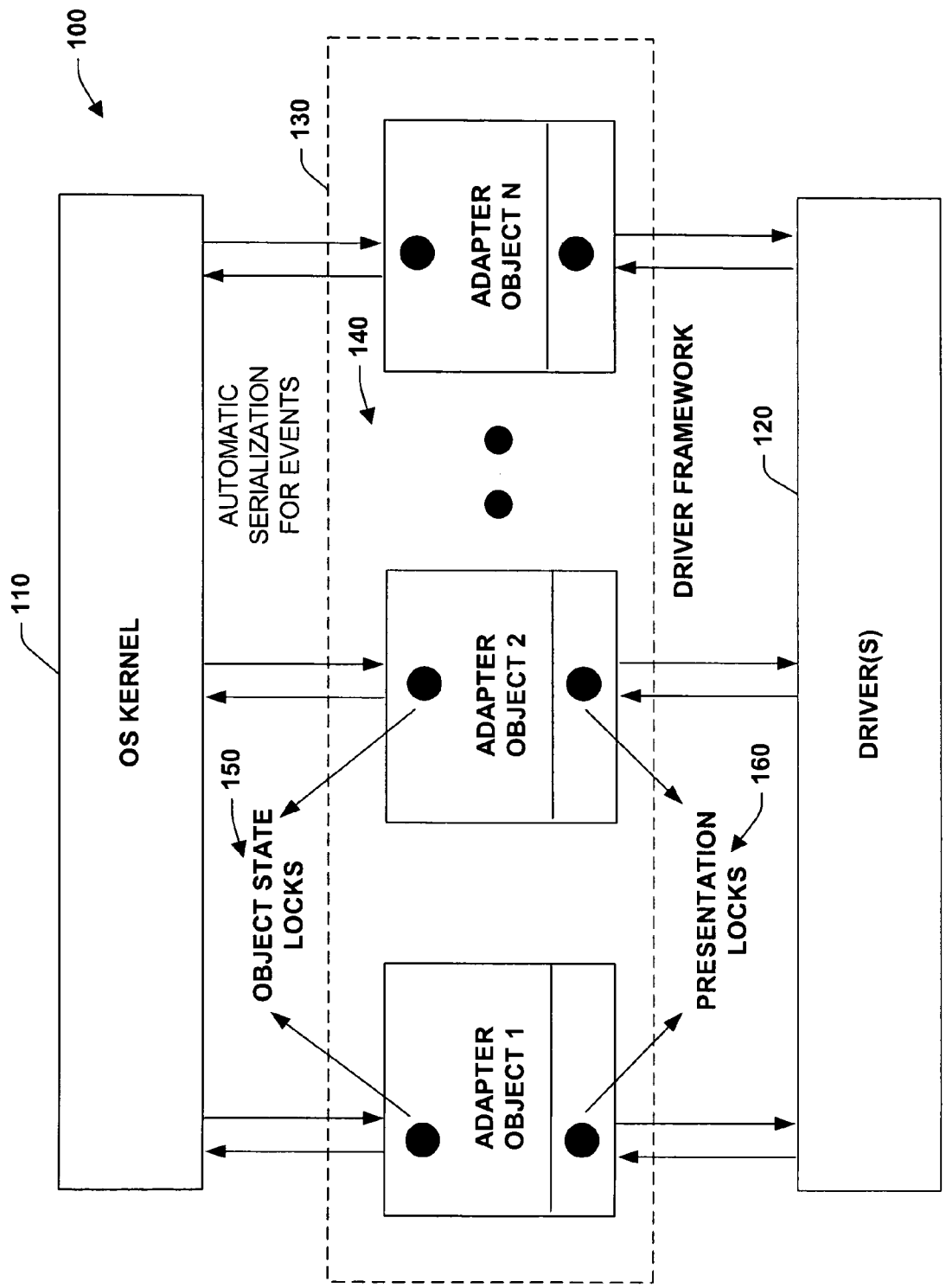
FIG. 1 is a schematic block diagram of a driver management system and model in accordance with an aspect of the present invention.

Referring initially to FIG. 1, a driver management system and model 100 is illustrated in accordance with an aspect of the present invention. The system 100 includes an operating system of kernel 110 that generally operates or performs in a multi or highly-threaded software environment (e.g., tens, hundreds or thousands of threads). The kernel 110 interacts with a lesser or lower-threaded module (e.g., less than 10 threads) such as one or more drivers 120 via a driver framework component 130 (DFC). In one aspect, the DFC 130 includes a presentation manager (not shown) that selectively exposes one or more objects 140 that facilitate interactions between the kernel 110 and the drivers 120.

In general, the objects 140 act as an adapter between the highly threaded environment of the software system 110, and the potentially less threaded model of a software plug-in such as the drivers 120. The adapter object 140 generally includes internal state data, and one or more sets of locks for managing interactions between system and modules. For example, these locks can include an internal object state lock 150 that provides synchronization for modifications to internal object state data. These locks are acquired and released for short time intervals in response to an event from the system 110 that modifies the object, or an API call from the software module or driver 120. This type lock is held as long as is required to perform a state update in a consistent manner wherein respective routines exposed to the highly threaded internal software environment 110 follow applicable operating rules associated therewith.

Another type lock includes a presentation lock 160 that is acquired when events are presented through callbacks into the less threaded software module 120. When an event handler callback (or other routine) returns, this lock 160 is automatically released. In general, the Internal object state lock 150 is not held during these event callbacks. The length of time that the presentation lock 160 is held depends on the threading of the software module being called, and can differ markedly from the amount of time that the Internal object state lock 150 is held.

The object adapter 140 in one example employs a series of reference counts, request deferrals, and other programming practices to facilitate object lifetime and event exposure to the less threaded software module 120 that generally does not rely on holding the internal state lock 150. An object's internal state may transition while the presentation lock 160 is held, and the notification of these transitions can be queued until the presentation lock 160 is released. Since the Internal state lock 150 is not held on event callbacks into the software module 120, the software module is free to call API's exposed by the object from within the event handler that is holding the presentation lock 160. Changes to object state that occur as a result of these API's that would raise a new event are deferred until the presentation lock 160 is released, similar to the arrival of system events to the object 140.

The DFC 130 provides a software layer (or hardware layer) to act as a boundary layer between the highly threaded software system 110 and less threaded plug in modules 120 in a manner that does not compromise the scale-ability of the overall system 100. Internally, the DFC 130 can provide a number of objects on behalf of the driver 120. These objects form the basis for request dispatch, locking, and synchronization, for example.

One aspect of the DFC 130 is to automatically manage synchronization and race conditions that can occur in a driver environment. This also provides a flexible configuration model in which the driver designer can select the amount of synchronization desired, depending on device requirements and performance goals. In order to provide this flexibility, the DFC 130 can provide a number of 'synthetic' I/O dispatch and synchronization models to the device driver designer. The performance of these models can vary depending on the bandwidth and request rates of a particular device. For example, a driver that employs DFC 130 managed synchronization models can also utilize DFC supplied functions for synchronization. This allows the framework 130 to acquire and release the proper locks according to the context. When this model is chosen, the frameworks handle driver dispatch, synchronization, as well as complicated conditions such as IRP cancellation synchronization in single and multi-processor environments.

One model of dispatch in the DFC 130 is event driven by the device driver 120 registering a set of callback functions to the objects 140 at some time in its initialization. The various objects 140 can then call these functions to signal an event such as when a request is ready for the driver 120 to service. Also, the DFC 130 can raise events that occur such as Delayed Procedure Calls (DPC's), I/O cancellation, plug and play or power management, for example. Synchronization that occurs between these callbacks and the various events can depend on the dispatch and synchronization model selected by the driver when it is initialized.

Figure 2:
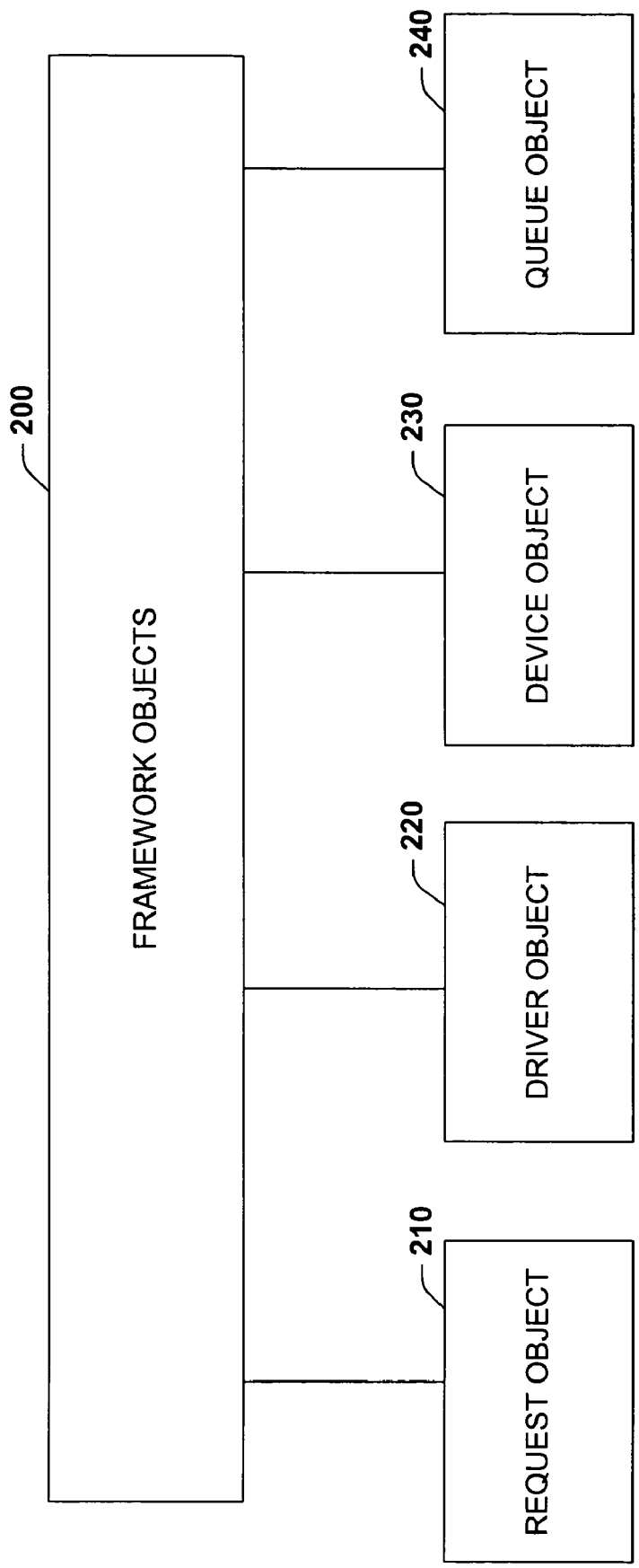
FIG. 2 is a diagram of an example framework objects in accordance with an aspect of the present invention.

Referring now to FIG. 2, example framework objects 200 are illustrated in accordance with an aspect of the present invention. As noted above, one or more objects 200 can be supplied by a framework component that provide an interface between highly-threaded systems and lower-threaded modules. For example, at 210 a Driver Frameworks Request Object can be generated or presented by the framework component. This object represents a request as managed by the driver frameworks, and various packages. A request may be passed to a driver by a package, and the driver can operate on the request by a set of exported methods. Driver Frameworks packages generally track a request, even if it's currently being operated on, or is "owned" by the driver due to an outstanding I/O that has been passed to the driver but not yet completed. A request object can be represented by a handle DFXREQUEST, for example.

At 220, a Driver Object can be provided. The driver object represents a driver object that the driver frameworks and associated packages manage. The Driver object 220 may include one or more Device Objects 230 depending on the driver's configuration and successful calls to DrvDeviceAdd (), for example. The Driver object 220 can be represented by the handle DFXDRIVER, for example. The Device Object 230 represents a framework Device object, and is also a main data-structuring object for the driver. Synchronization models can be optimized around the Device object 230 holding most, if not all, per device data. The Device object 230 can be represented by the handle DFXDEVICE, for example, and can be owned by a parent Driver Object 220.

At 240, a Queue object represents a series of I/O requests that have been accepted from an I/O Dispatch function by a package, and have not been completed yet to the operating system. In most cases, these I/O requests are STATUS_PENDING in a driver sense. The Queue object 240 is a logical concept according to the driver that can represent an order of outstanding requests, but does not have to lock in a specific ordered implementation, allowing for models in which the driver has control over the priority of requests. A Queue object 240 generally belongs to a Device object 230, and a particular device may have multiple queues, configured by its driver. The synchronization models supported by the packages allow for fast operation of multiple queues on a device if the synchronization model is configured as per queue. The Queue object 240 can be represented by the handle DFXQUEUE, for example. When the Driver Frameworks have dispatched a request to the driver, it continues to track an I/O request on a particular queue until the driver has completed it so that it may handle events such as IRP cancellation, device power management state changes, and so forth.

Figure 3:
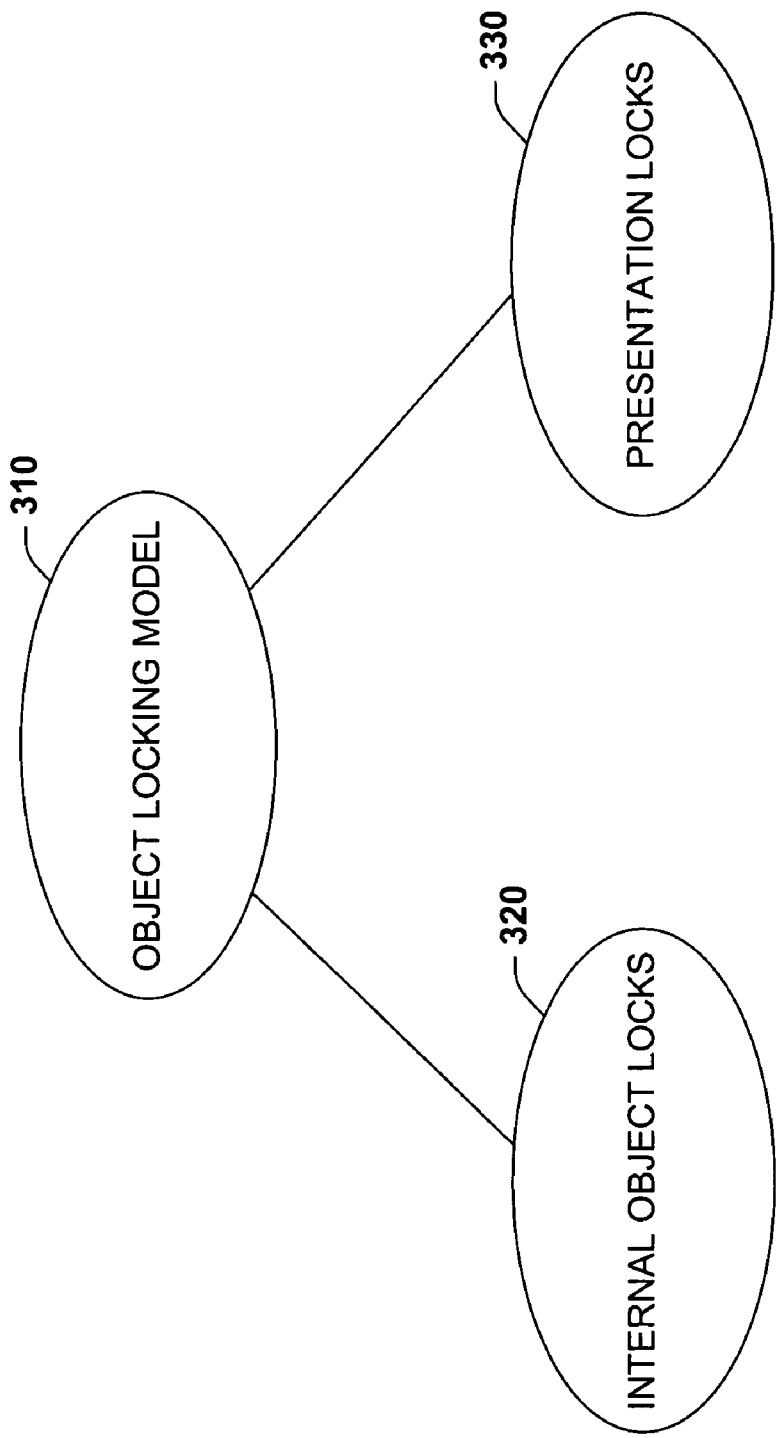
FIG. 3 is a diagram illustrating object-locking models in accordance with an aspect of the present invention.

Turning to FIG. 3, an object-locking model 300 is illustrated in accordance with an aspect of the present invention. As discussed above, the driver frameworks component can be implemented by presenting a series of objects to a device driver. The device driver extends these objects by allocating per object device context data, and registering callback functions to the device driver to act as event handlers. The per object context data is a location for the device driver to associate its internal data structures with the object.

The object-locking model 300 can include one or more internal object locks 310. Since a Frameworks object is a higher level, state-full object, it makes internal state transitions in response to events that occur and are processed by the frameworks. Frameworks objects can also cause internal state transitions as the result of API calls from the device driver onto the object's methods. Since these objects operate in a multi-threaded environment, they protect their internal data structures so that these state transitions are consistent. Driver frameworks objects can protect their internal state transitions with internal object locks 310.

The device driver generally cannot directly access these internal object locks 310 in order to acquire them, or release them. These locks are acquired and released automatically by the frameworks object as the result of the driver calling frameworks API's, thus the device driver can indirectly effect these locks. One design principle of the driver frameworks objects is that the device driver has no facility to prevent a driver frameworks object from making an internal state transition. This is due to the free threaded operation of the I/O system, and the internal implementation of the driver frameworks objects to conform to this requirement of the I/O system.

Due to this free threaded requirement, internal object locks can be implemented utilizing spinlocks. Design guidelines for these objects can include that spinlocks are held for a minimal amount of time to perform a state transition. The driver frameworks objects implement a fine-grained internal object-locking model, rather than global, or "chunky" locking models. Fine-grained in this sense implies a dedicated lock at least per object instance. This does not generally imply that the driver frameworks is prevented from optimizing its internal I/O "common paths" to share certain locks. This tuning can occur automatically over time as the frameworks are performance profiled.

Another design aspect of the driver frameworks objects is that internal locks are not held across event callbacks to the device driver. This may prevent the device driver from calling API's on that object without resorting to recursive locks, and may provide mismatches between events internal to the frameworks and the device driver's ability to handle these events. As an example, an IoQueue object that has no requests should not be prevented from going into a ready state as the result of a request arriving. This is since requests may arrive automatically from the I/O subsystem and delivered to the IoQueue, thus causing it to transition from a "No Requests" state to a "Have Requests" internal IoQueue state.

Another aspect to the object-locking model 300 includes one or more presentation locks 320. These locks allow a device driver to synchronize when the driver frameworks objects callback into the device driver, and in some cases delay, or synchronize the callbacks to a driver-controlled state. The device driver may also have a different threading or synchronization model than the free threaded model internal to the frameworks and the I/O model. In order to provide this synchronization, Driver frameworks objects implement event callbacks via presentation locks. Presentation locks 320 synchronize these event callbacks between the device driver and the frameworks object.

Depending on the locking model selected by the device driver, presentation locks 320 may be acquired automatically by the frameworks when an event callback is invoked, thus serializing that event for the particular object, or the device driver may call locking API's exposed by the object that prevent event callbacks until the lock is released. It is noted that holding a presentation lock does not prevent the object's internal state from changing, but that the object will not invoke the event callback handler while the presentation lock is held. When the presentation lock 320 is released, new event callbacks may occur if the object is in a state that may require it to raise the event to the device driver. In the previously mentioned IoQueue example, if an I/O request arrives from the I/O system while the IoQueue's presentation lock is held by the device driver, it will still transition internally from the "No Requests" to the "Have Request" state. However, the device driver is not notified by the event callback (e.g., DrvIoStart callback) until the presentation lock for that IoQueue is released.

Depending on the device driver's configuration, and the driver frameworks objects, event callbacks may be at DISPATCH or PASSIVE level. In order to properly support events that may occur at DISPATCH or PASSIVE level, presentation locks can be implemented with spinlocks and/or FAST_MUTEX's. Which lock is acquired can depend on the event's context, and the drivers configured threading model. In cases in which multiple objects may exist, such as for Device and IoQueue, API's for the presentation locks 320 generally act on the object instance, not the whole family of objects. So holding the presentation lock on one IoQueue does not prevent other IoQueues from invoking their callback handlers. Depending on the driver's design and configuration, this may not be desirable. In this case one of the hierarchical locking models may be chosen which are described in more detail below.

Figure 4:
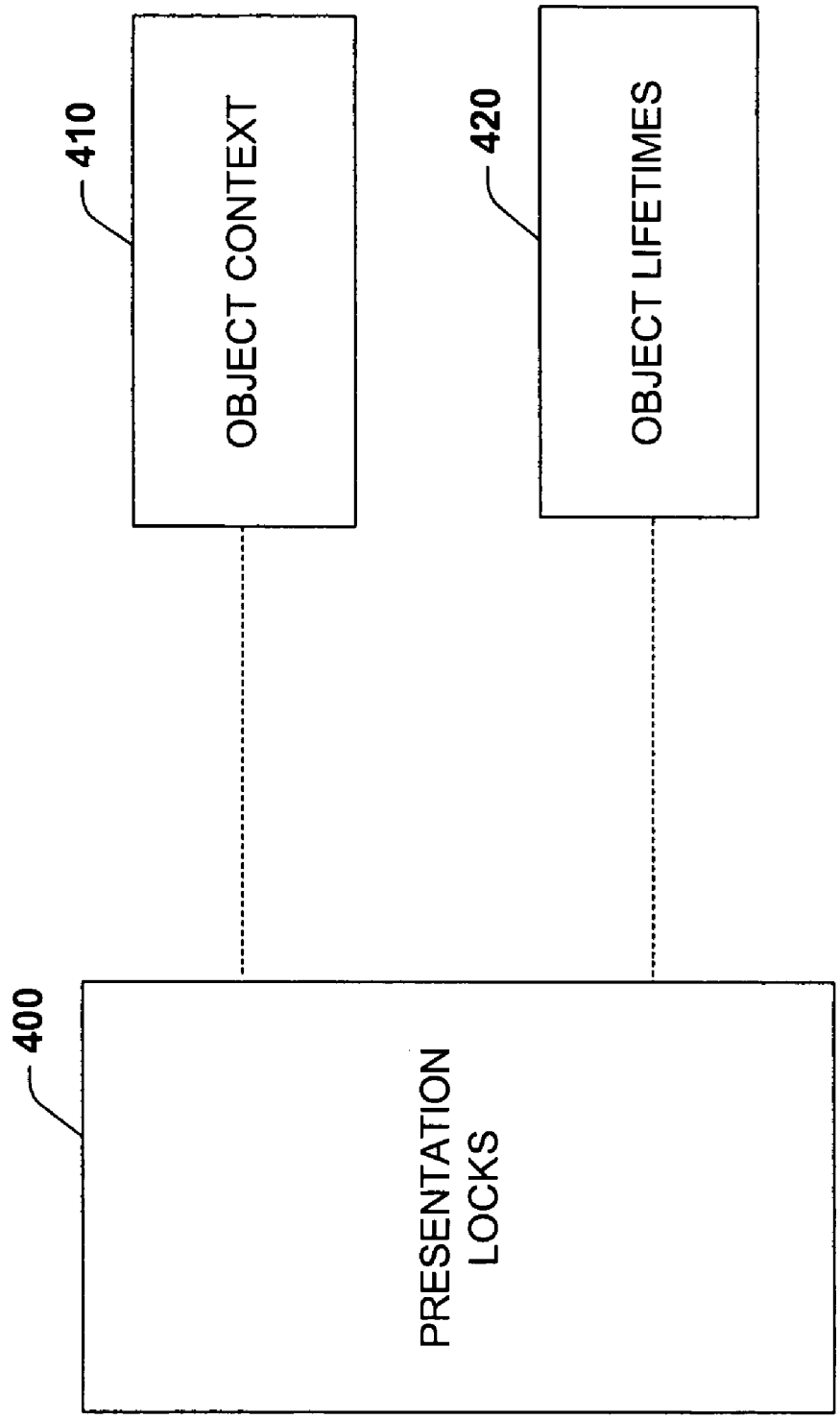
FIG. 4 is a diagram illustrating presentation lock aspects in accordance with an aspect of the present invention.

FIG. 4 illustrates other aspects of presentation locks 400 in accordance with an aspect of the present invention. At 410, presentation locks and object context is considered. Generally, each driver frameworks object allows the device driver to specify an optional Context memory allocation to be associated with the object's handle. This context memory is intended for the driver's use for storing its primary data structures, or pointing to them. This allows the device driver's data model to "follow" the frameworks supplied object hierarchy, and have its data be presented as an "extension" of the frameworks objects. The driver frameworks generally do not access this memory during the lifetime of its associated object handle, and the memory is provided for the device driver. If a device driver only accesses a particular object's context memory from within event callback handlers from that object instance, the device driver's context memory, and thus its data structures would be automatically synchronized by the presentation lock on behalf of the device driver.

For cases when a device driver needs to access this context memory from outside of the object instances event callback handlers, it can use the objects presentation lock API's to manually synchronize with the objects event callback handlers. This may occur for example under a driver managed worker thread or DPC routine, though the driver frameworks provides facilities to automatically synchronize these routines as well. This potential for automatic synchronization strongly encourages the device driver to be written utilizing the frameworks objects context memory, rather than global, or other memory allocations. By structuring the device driver in this manner, the device driver can optionally select to have the frameworks provide the bulk of its synchronization on its behalf. Since device drivers differ in which "level" of object contains the primary data structure(s), the frameworks provides different device driver configured locking levels, which are described below.

Proceeding to 420, presentation locks and object lifetimes are considered. Generally, neither of the locks, either the internal, or the driver visible presentation locks manage object lifetimes. Object lifetimes are typically managed by the driver frameworks object manager via reference counting or garbage collection for example, in a managed object system. Most driver frameworks object lifetimes are managed by the frameworks acquiring and releasing reference counts automatically. The device driver rarely if ever manages object reference counts, except for special situations, or for utility objects that it has allocated.

Holding a presentation lock does not prevent an object from leaving memory if its reference count has been decremented. In cases where a device driver is managing an object's lifetime, it is responsible to ensure the proper reference count has been taken on the object for the duration of the time it is holding the lock on it. De-referencing an object causing it to delete while holding a presentation lock can result in a bug check operation.

Figure 5:
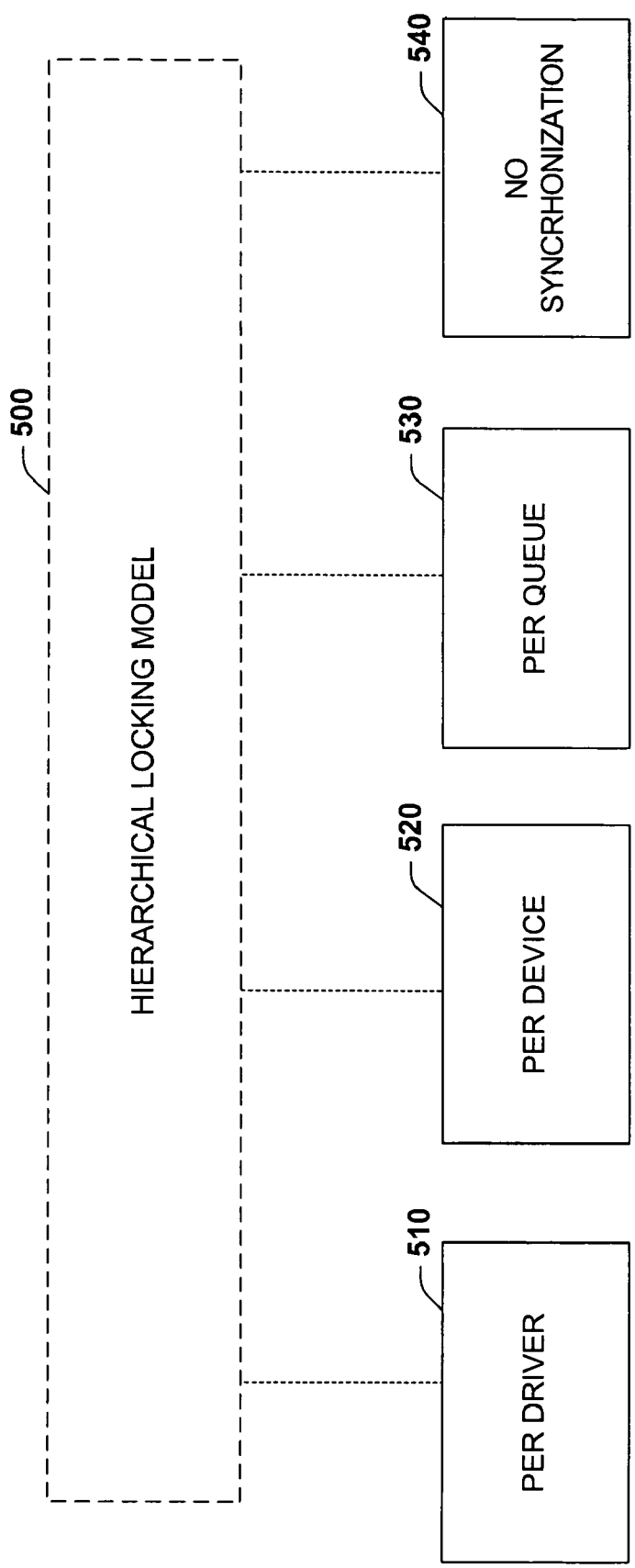
FIG. 5 is a diagram illustrating a hierarchical locking model in accordance with an aspect of the present invention.

FIG. 5 illustrates a hierarchical locking model 500 in accordance with an aspect of the present invention. Device drivers often differ in how their primary data structures are associated with objects, and how their I/O flows occur and which the objects data is accessed during primary I/O flows. To allow flexibility, the device driver locking model allows a primary synchronization object level to be chosen by the driver at configuration time. Device driver locking models managed by the frameworks rely on the context memory model described previously to provide driver data structure storage, or pointers to driver data structures. These data structures may be accessed from event callback handlers for its associated object, or may be accessed through pointers in other objects. This generally effects how access to these structures is synchronized.

A simple device driver may store most of its data on the Driver object, and would be similar to a "global data" based driver. Such a driver may have pointers in the Device and IoQueue objects to this common global data, and may require synchronization across all event callbacks to the Driver level. Many device drivers may associate most of their per device object data on the context memory for the Device object. This may point to common registers, data, and I/O lists, for example. If such a driver has multiple IoQueues (such as a read and a write queue), they may point to the device object's context memory in order to synchronize device level data. Such a driver in this case may require synchronization to the Device level, even for event callbacks occurring on the IoQueues.

A driver designed for highly parallel processing may attempt to only access information stored in the context of each separate IoQueue. In this case it may desire individual locks on the IoQueue's to allow processing to proceed in parallel. This relationship between the driver frameworks objects, and the associated device driver context memory, implies an object hierarchy 500. This hierarchy implies a similar hierarchy in which locks "protect" objects underneath. In order to support this hierarchical structuring of the driver's data, the Driver Frameworks can provide the following device driver locking models that follow this hierarchy.

At 510, a Per Driver model can be provided. Synchronization occurs by the driver frameworks across the whole device driver, and its frameworks objects. If a driver manages multiple devices, or multiple queues on a single device, the synchronization of event callbacks may utilize the Driver objects presentation lock. This is useful for drivers written or ported that use a lot of global data. Depending on the dispatch model and code paths, performance with this type of synchronization may be acceptable for certain types of simple drivers and devices.

At 520, a per device model can be employed. This is a useful model for a device driver that supports multiple devices. The driver frameworks can synchronize event callbacks for the Device object and below (IoQueue object) with the device object's presentation lock. The device driver is expected to store per device state in the per device context, so that proper synchronization of access can occur. A driver written to use per device locking should be careful of the use of global data and data stored in the driver context. Child IoQueue objects event callbacks can be synchronized to their parent device's presentation lock.

At 530, a per queue model can be provided. This model allows a device that has multiple queues to operate in parallel. A serial port is a good example in that it has a read and a write queue. Per queue synchronization allows a device driver to operate each queue in parallel if its data structures and hardware is organized in such manner, aided by the per queue context memory. The driver synchronizes at the device or driver level when access to common structures is required.

At 540, a no synchronization model can be selected. The entire burden of synchronization is on the driver. In the case of a device driver using the Frameworks, it also synchronizes with the driver frameworks event callbacks. The driver frameworks provide API's that allow the driver to synchronize with the frameworks objects event callbacks by manually (e.g., writing code to manage synchronization) allowing it to acquire and release the per object instance presentation locks. A device driver is also free to allocate lock objects on its own and manually synchronize from within event callbacks from the frameworks. In this case, multiple presentation events may occur in parallel, but the device driver synchronizes their effects on the device driver's data structures.

It is noted that the hierarchical locking model 500 can be provided and/or configured in various forms. For example, instead of providing a queue or queues, the queue can be an object or objects under Device, and provided as a per object lock. In addition, other implementations allow an arbitrary number of "levels", such as if a Queue had other objects beneath it.

Figure 6:
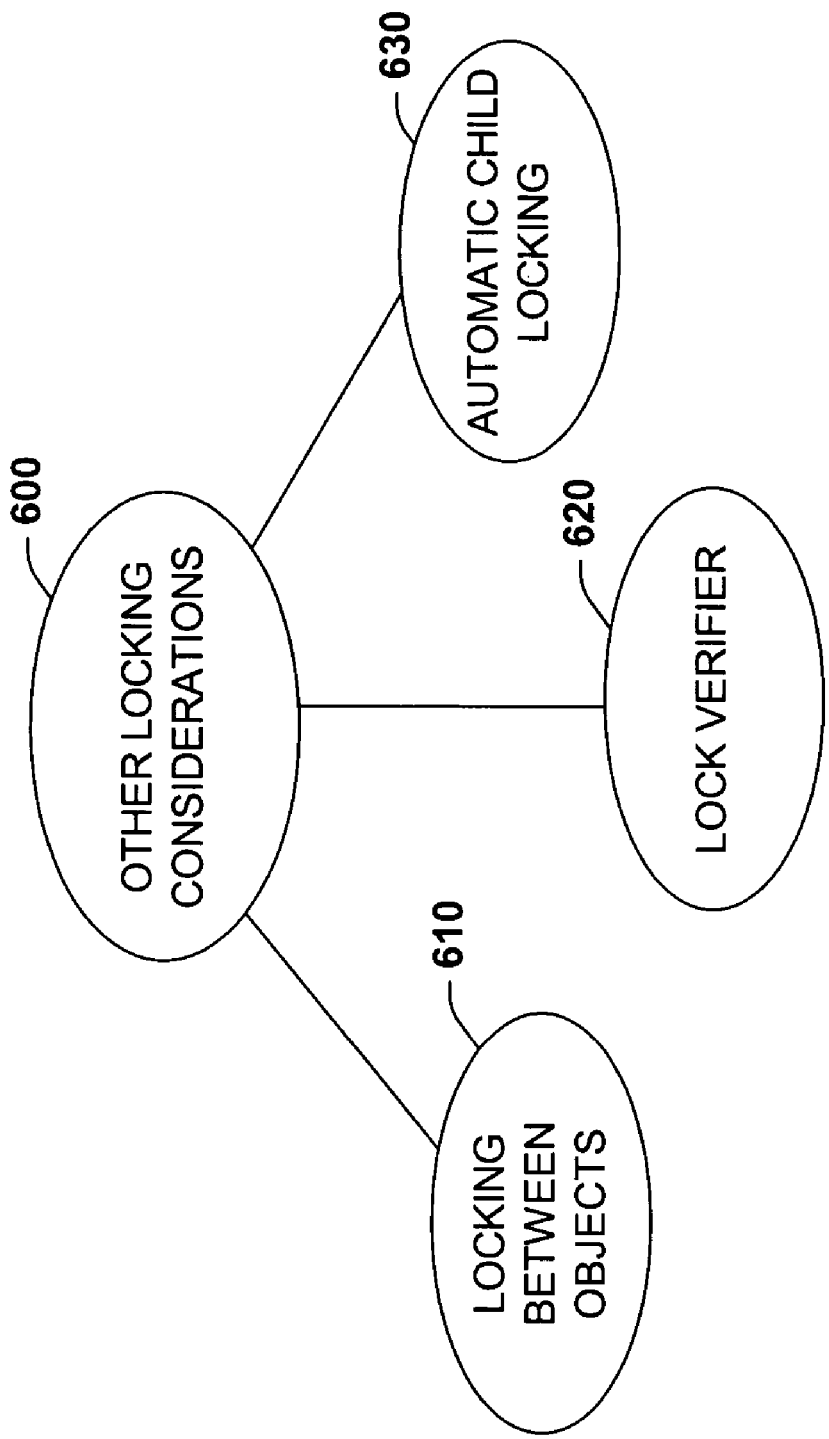
FIG. 6 is a diagram illustrating other locking considerations in accordance with an aspect of the present invention.

FIG. 6 illustrates other locking considerations 600 in accordance with an aspect of the present invention. At 610, locking between objects is considered and processed. In one aspect, the driver frameworks also export functions to allow a driver to manually acquire and release an object instances presentation locks. These are utilized by a device drivers worker threads, DPC's, or callbacks from lower level drivers that need to synchronize with event callbacks from a frameworks object. These functions are also utilized if the driver has configured the frameworks to not automatically acquire an objects presentation lock on event callbacks, so that the driver may have full control.

In order to avoid deadlocks, the driver frameworks can implement an explicit lock hierarchy and sequence that specifies the order locks must be acquired in. This hierarchy is the hierarchy utilized by the Frameworks when automatic locking is configured by the driver, so that the device driver and the frameworks can co-ordinate. At 620, a lock verifier checks against this hierarchy if it is enabled. A device driver that desires to utilize its own hierarchy should thus allocate and use its own spinlock and FAST_MUTEX objects, for example.

The ordering of the frameworks lock hierarchy can be as follows:

Driver Lock->Device Lock->Queue Lock

This implies that a thread can acquire a Device Lock while holding the Driver Lock, and can acquire a Queue Lock while holding a Driver or Device Lock. If a lock higher on the level is desired, the lower lock is released first, otherwise a deadlock will occur.

The Driver Frameworks can implement the Lock Verifier 630 internally to detect object hierarchy lock violations at runtime. Each object is assigned a level in this hierarchy, and allocation order numbers are assigned for its internal locks, and its presentation locks. The frameworks can verify calls to acquire and release these locks as events flow between the frameworks and the device driver. If a lock verification failure occurs, the Driver Frameworks can breakpoint into a debugger or other component, if desired.

At 630, automatic child object locking is considered. Generally, the driver frameworks encourage a hierarchical structure to the device driver's instance data structures utilizing the device driver context memory that can be associated with the frameworks managed objects. This data can be protected by previously described locking models. One aspect of distributing the driver's data between these objects is how to synchronize the access to data structures that may be accessed by "child" objects lower in the hierarchy.

This can be resolved by selecting a locking level at the object that is shared. In the case of a Device object, wherein data is accessed by one or more of its child IoQueue objects, the Device locking level may be selected. In this configuration, any event callbacks raised on the Device or any of the child IoQueue objects acquire the Device's presentation lock. In this manner, event callbacks on the Device and the IoQueue's are synchronized, and event callback handlers for the Device or any of the child IoQueue's may access and modify this data.

In order to support more parallel processing in a driver in which most requests may be serviced at the IoQueue, the IoQueue locking level is available that will generally only acquire the presentation lock of the IoQueue instance in which the event callback is being invoked. Even in a per IoQueue locking model, common configuration data may be available in the Device context which needs to be accessed. If this configuration data is mostly read only, this sharing is considered safe. But, if Device events can cause this information to be re-configured, the Device event callback handler facilitates that no IoQueues are concurrently accessing its context information.

In order to accommodate this synchronization, the Driver frameworks can lock child objects by default when a parent object's presentation lock is acquired. This facilitates that child objects event handlers are not accessing the structure. This structure is based on the parent objects controlling configuration and data changes at the parent object, and child objects "looking at" information in a read-only or thread safe manner. Automatic locking operates on the Driver, and Device objects. In the case of the Driver, all its child Devices are generally locked, including each Device objects child IoQueue's. In the case of the Device, the child IoQueues for that Device object are locked. This behavior is present when DfxLockingDevice, or DfxLockingQueue is selected, for example.

This behavior can also occur for DfxLockingDriver, since in effect a single lock is shared across the whole driver, even though the frameworks in this case does not have to explicitly lock any child objects. If this is undesirable, the configurations DfxLockingNonHierarchicalDevice, and DfxLockingNonHierarchicalQueue configure Device or Queue level locking without child object locking behavior. In these cases, the device driver is responsible for manually locking its child objects as required using locking API's, for example.

Figure 7:
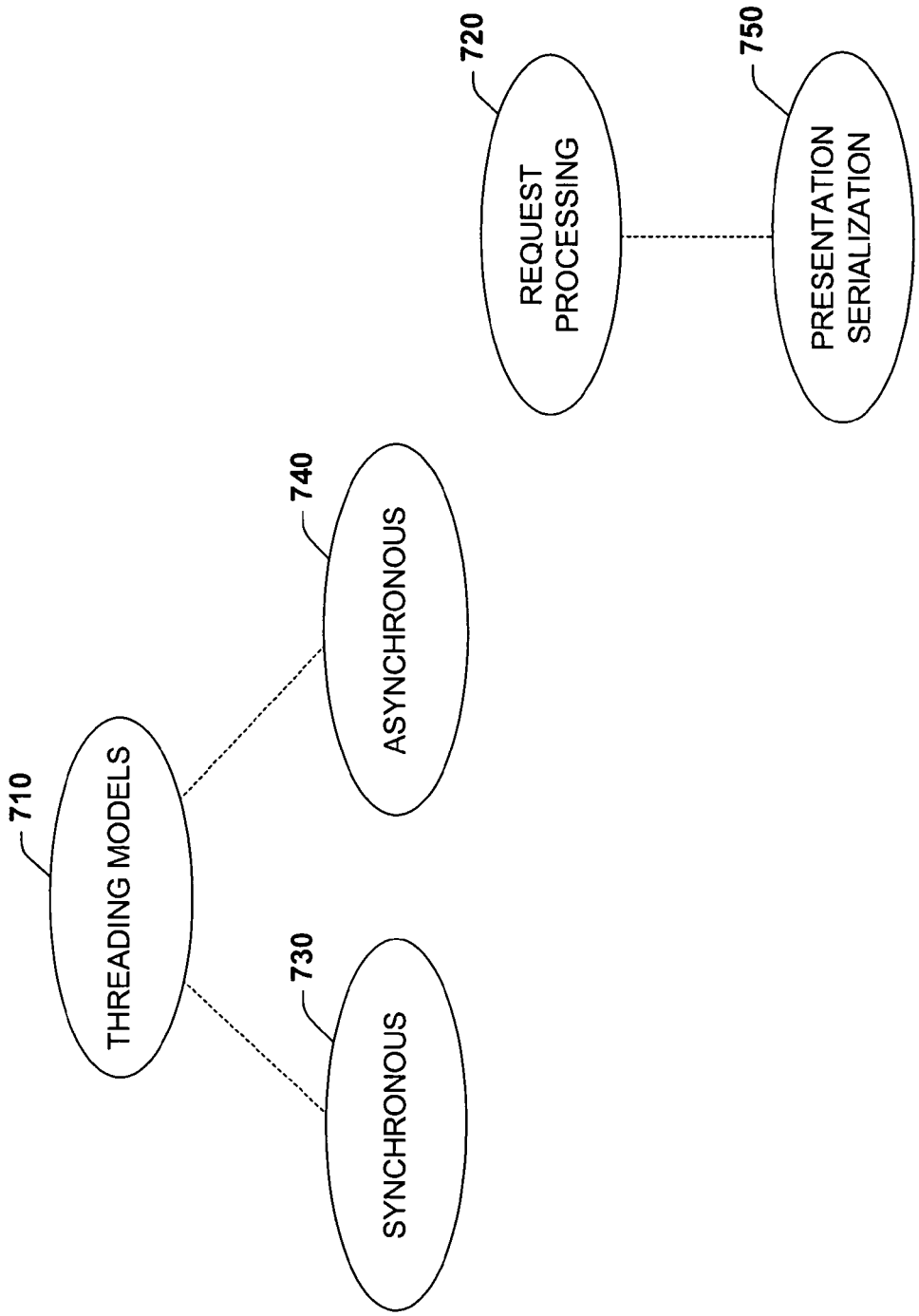
FIG. 7 is a diagram illustrating threading models and processing considerations in accordance with an aspect of the present invention.

FIG. 7 depicts threading models 710 and processing considerations 720 in accordance with an aspect of the present invention. Independent of dispatch and driver presentation synchronization, there is a threading model 710. The threading model 710 basically answers the question, "does the driver expect to block in an objects event callback handler?" In a device driver stack, it is only under carefully controlled conditions that a driver can block a request thread. But a sequential threaded programming model allows for easy understanding of a driver if Driver or Device level synchronization is used. Thus, to support an easy to program environment option for driver designers, the driver frameworks provide for a thread synchronous dispatch and request model in addition to an asynchronous "free threading" model that does not allow threads to block in an object's event callback handler.

The threading model 710 generally comes into play when the Driver Frameworks dispatch a request or event to the device driver on one of the callback interfaces. If the device driver expects to be able to block the thread to wait for some event, it is called a synchronous threading model 730, and if the driver adheres to a rule to not block a thread in a dispatch callback from the frameworks, this can be an asynchronous or "free threading" model 740.

For a Synchronous Threading model 730 (Allows Blocking), the device driver has a potentially block-able thread context on event callbacks from the frameworks on requests and events. This minimizes the complexity of a state machine that is maintained for simple drivers. This model may with a performance cost in the operating system. This is due to the fact that the frameworks allocates system work items and utilizes system threads to dispatch requests and events into the driver. The latency and overhead of queuing this request to a worker thread, context switching to it, and then calling into the driver is more than the asynchronous threading model 740 in which the I/O package can utilize an arbitrary thread context to dispatch requests and events. The common case in most driver requests and events presented to the frameworks is arbitrary thread context, so it is likely this overhead will be per request.

Performance of a driver using this model 730 will likely be more dependent on the frequency of I/O requests and responses from the hardware (interrupts, DPC's, etc.) than on actual transfer bandwidth. This is likely because the overhead is in dispatching each request, as opposed to the actual time to transfer data, which utilizes the same data transfer mechanisms as the free threading model. Thus, devices with infrequent requests and/or large sized requests can be reasonably served with this threading model. Synchronous threading does not imply that single threaded Driver level locking is used. A synchronous threading model with Device or Queue level locking can allocate multiple threads in order to dispatch requests and events into the driver concurrently.

Even though synchronous threading guarantees thread context on event callbacks, it generally does not guarantee a specific thread, such as the thread that originated the request. It also generally does not guarantee that the same thread will be used for all event callbacks, allowing the frameworks to utilize thread pools for efficiency. Synchronous threading generally utilizes PASSIVE level locks such as FAST_MUTEX's for presentation locks. Certain frameworks objects may still have DISPATCH level synchronized event callbacks, such as I/O cancellation. These event callbacks cannot block, and synchronization with these callbacks occur by manually acquiring and releasing a spinlock version of the objects presentation lock.

Asynchronous or free threading models 740 generally result in the highest performance for the device, and the system. This model desires that the driver not block in an event callback handler from a driver frameworks object. All event callback handlers should process the event, possibly updating an internal driver state machine, and return from the event callback handler without blocking the current thread for any length of time other than normal spinlock style synchronization waits. This model 740 has the highest performance since it allows the driver frameworks to dispatch event callbacks into the device driver from an arbitrary context that is directed into the frameworks internally from the driver interfaces.

Since synchronization operates across any thread context, including DPC handlers, a spinlock can be used for the presentation lock, and thus event callbacks occur from DISPATCH level. In free threaded mode, certain frameworks objects have PASSIVE level events, mostly due to constraints of Plug and Play, and Power Management subsystems in the operating system model. These events are documented as synchronized utilizing the proper passive level locks from driver worker threads. PASSIVE level event callback handlers utilize the spinlock based presentation locks to manually synchronize with DISPATCH level events on the same object.

At 720, request processing is considered and can include Request Presentation Serialization at 750. Independent of locking and threading, a device driver processes a series of requests to service I/O from the I/O system. These I/O requests are presented by the Driver Frameworks by an associated I/O Package utilizing an IoQueue object. The IoQueue object raises its DrvIoStart event callback when a request is ready from the I/O system. A driver may utilize the IoQueue presentation lock to serialize the execution of DrvIoStart, but when it returns from DrvIoStart (or manually releases the IoQueues presentation lock in driver managed locking), DrvIoStart can be called again for a new request even if the previous request has not yet completed.

Figure 8:
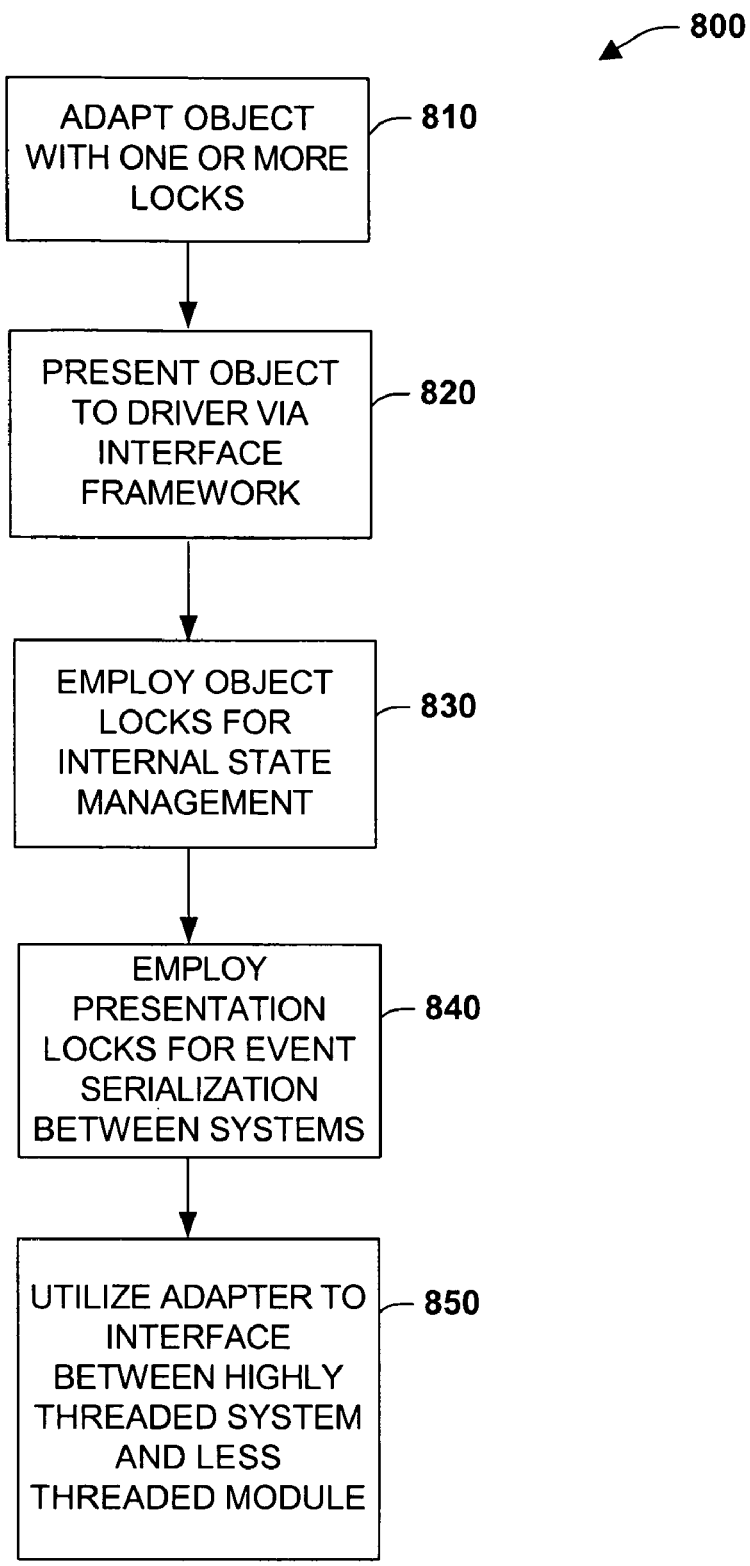
FIG. 8 is a flow diagram illustrating an automated process for interacting between a highly threaded environment and a less threaded module.

FIG. 8 is a flow diagram illustrating thread interface processing in accordance with an aspect of the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 810, an object adapted with one or more locks. As noted above, this can include such aspects as internal object state locks, presentation locks, and/or other type locks. At 820, the object is present to a driver or module via a framework component that acts as an intermediate layer between a system such as an operating system and a module such as a device driver, for example. At 830, object locks are employed for internal state management of the driver or lower-end module. At 840, presentation locks are provided for event serialization between systems. Such locks enable one or more threads in one system from being affected or impacted from one or more threads in another system. At 850, the adapter and associated locks are employed to facilitate interactions between a highly threaded system such as an operating system and a less threaded system such as a driver.

Figure 9:
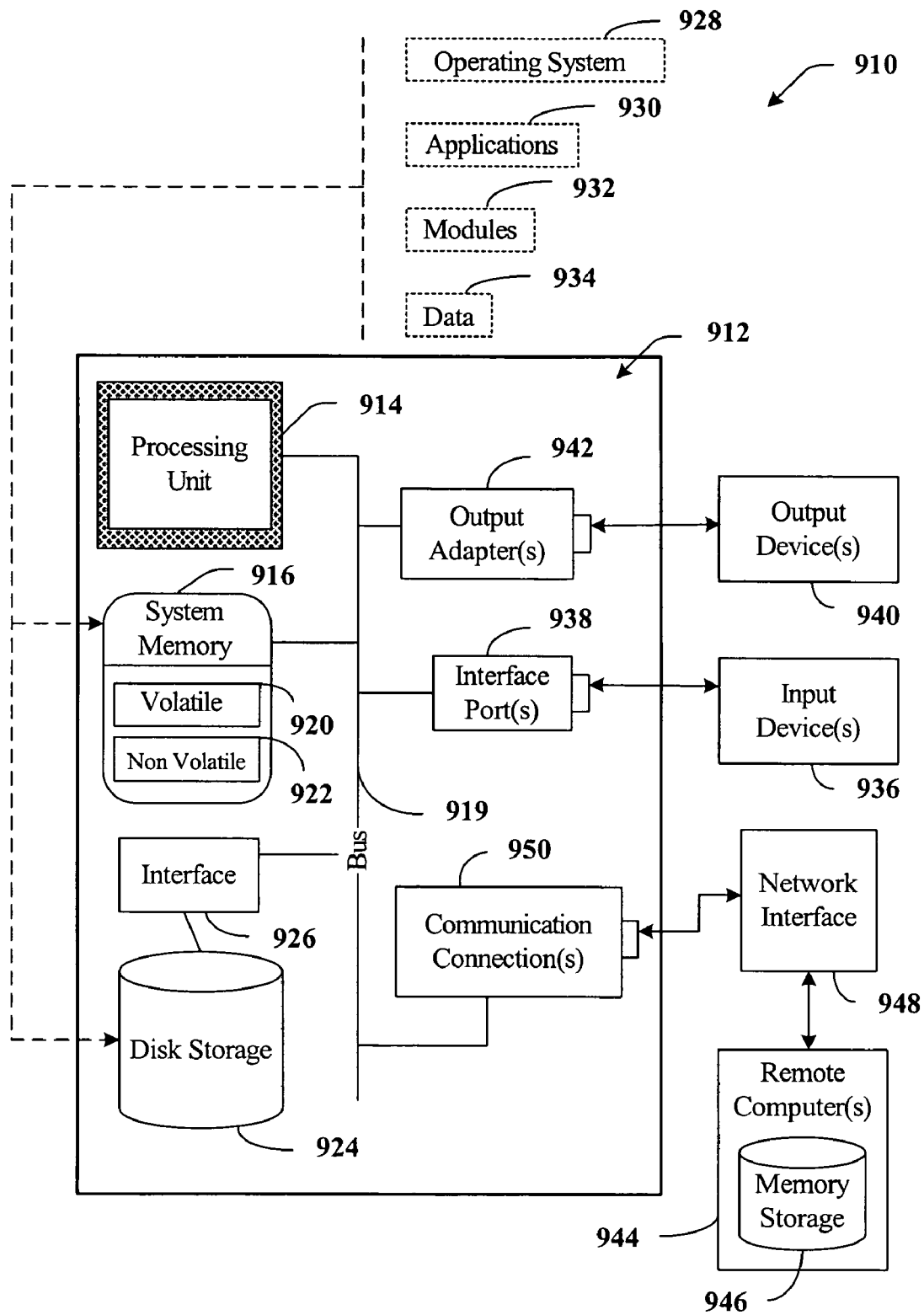
FIG. 9 is a schematic block diagram illustrating a suitable operating environment in accordance with an aspect of the present invention.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 16-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the present invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

Figure 10:
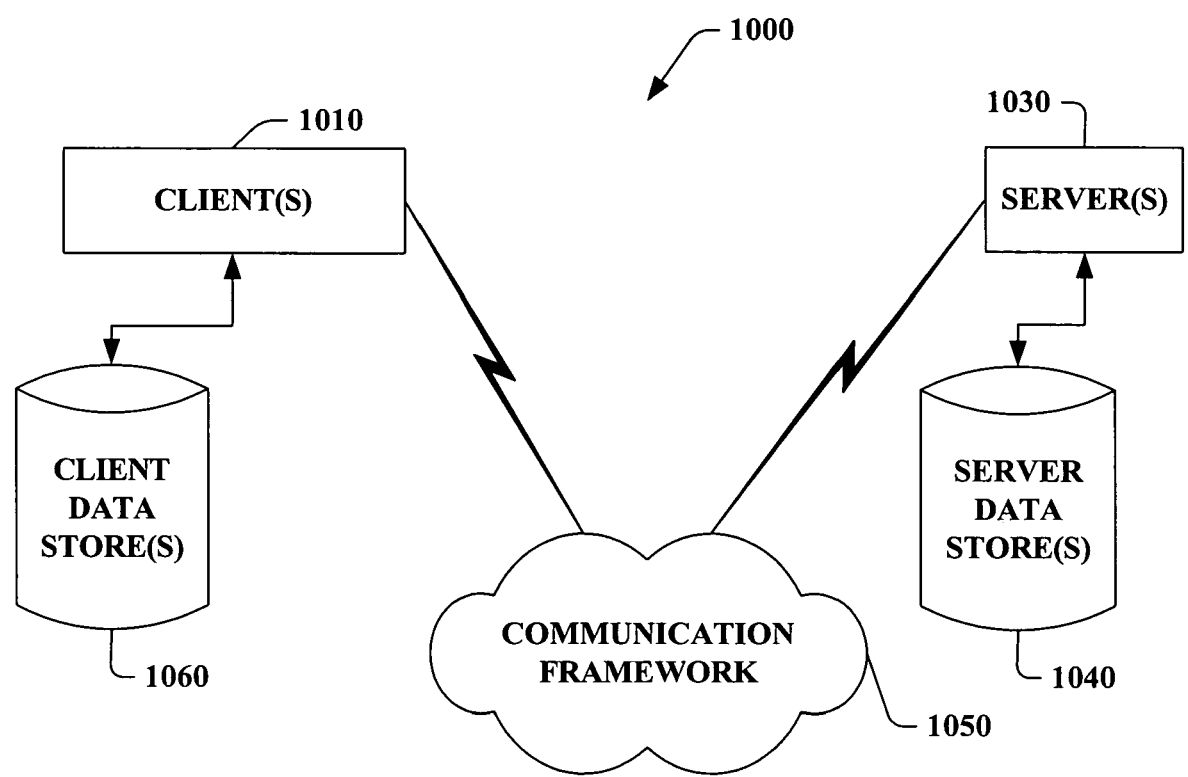
FIG. 10 is a schematic block diagram of a sample-computing environment with which the present invention can interact.

FIG. 10 is a schematic block diagram of a sample-computing environment 1000 with which the present invention can interact. The system 1000 includes one or more client(s) 1010. The client(s) 1010 can be hardware and/or software (e.g., threads, processes, computing devices). The system 1000 also includes one or more server(s) The server(s) 1030 can also be hardware and/or software (e.g., threads, processes, computing devices). The servers 1030 can house threads to perform transformations by employing the present invention, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer storage medium having stored thereon a driver management system executable by a processor comprising:
   a driver framework component (DFC) that is separate from a driver, the DFC comprising:
   a presentation component that selectively exposes adapter objects to the driver in a multi-threaded environment, the adapter objects synchronize interactions between the driver and the multi-threaded environment according to a hierarchical locking model selected by the driver at configuration time, the hierarchical locking model determines a primary synchronization object level at which locks are applied during synchronization, the available synchronization object levels include at least one of a driver level, a device level, or a queue level.

2. The driver management system of claim 1, further comprising an operating system kernel that operates or performs in a multi-threaded software environment.

3. The driver management system of claim 2, the driver operates in a less-threaded software environment than the operating system kernel.

4. The driver management system of claim 1, at least one of the adapter objects includes internal state data and one or more sets of locks for managing interactions between the driver and the DFC.

5. The driver management system of claim 4, the at least one adapter object includes an internal object state lock that provides synchronization for modifications to the internal state data.

6. The driver management system of claim 5, the internal object state lock is acquired and released for short time intervals in response to an event from a system that modifies the at least one adapter object, or an API call from a software module or driver.

7. The driver management system of claim 5, the DFC automatically optimizes the sharing of internal object state locks between its internal I/O paths.

8. The driver management system of claim 4, the at least one adapter object includes a presentation lock that is acquired when events are presented through event handler callbacks into a less threaded software module.

9. The driver management system of claim 8, when the event handler callback returns, the presentation lock is automatically released.

10. The driver management system of claim 1, at least one adapter object employs a series of reference counts, request deferrals, or other programming components to facilitate object lifetime and event exposure to a less threaded software module.

11. The driver management system of claim 1, the adapter objects are employed for request dispatch, locking, or synchronization.

12. The driver management system of claim 1, the DFC automatically manages synchronization and race conditions that occur in a driver environment.

13. The driver management system of claim 12, the DFC provides a flexible configuration model in which a driver designer can select an amount of synchronization desired depending on device requirements or performance goals.

14. The driver management system of claim 1, the driver registers a set of callback functions to the adapter objects during initialization of the driver.

15. The driver management system of claim 1, the DFC raises events that occur such as Delayed Procedure Calls (DPC's), I/O cancellation events, plug and play events, or power management events.

16. The driver management system of claim 1, at least one adapter object is associated with at least one of a request object, a driver object, a device object, and a queue object.

17. The driver management system of claim 16, at least one of the objects is owned or derived from at least one other object.

18. The driver management system of claim 1, at least one adapter object including at least one of a spinlock, a shared lock, and a FAST_MUTEX.

19. The driver management system of claim 1, at least one adapter object allows the driver to specify an optional context memory allocation to be associated with the adapter object, the driver stores its primary data structure in the context memory to facilitate interaction with the data structure according to the DFC's hierarchical locking model.

20. The driver management system of claim 1, the hierarchical locking model includes a non-synchronization model that places the entire burden of synchronization on the driver.

21. The driver management system of claim 1, further comprising at least one of a synchronous and an asynchronous threading model.

22. The driver management system of claim 1, further comprising at least one of a lock for inter-object communications, a lock verifier, a lock organizer, and an automatic child-locking component.

* * * * *